US011219306B2

(12) United States Patent
White

(10) Patent No.: US 11,219,306 B2
(45) Date of Patent: Jan. 11, 2022

(54) SYSTEMS, DEVICES, AND/OR METHODS FOR MANAGING ELECTRICAL POWER

(71) Applicant: John White, Stuarts Draft, VA (US)

(72) Inventor: John White, Stuarts Draft, VA (US)

( * ) Notice: Subject to any disclaimer, the term of this patent is extended or adjusted under 35 U.S.C. 154(b) by 0 days.

(21) Appl. No.: 16/538,039

(22) Filed: Aug. 12, 2019

(65) Prior Publication Data

US 2020/0046114 A1 Feb. 13, 2020

Related U.S. Application Data

(60) Provisional application No. 62/717,805, filed on Aug. 11, 2018.

(51) Int. Cl.

| | |
|---|---|
| ***A47B 21/06*** | (2006.01) |
| ***H01R 13/518*** | (2006.01) |
| ***A47B 83/04*** | (2006.01) |
| ***B64F 1/36*** | (2017.01) |

(52) U.S. Cl.

CPC ............ *A47B 21/06* (2013.01); *A47B 83/045* (2013.01); *B64F 1/36* (2013.01); *H01R 13/518* (2013.01); *A47B 2021/066* (2013.01)

(58) Field of Classification Search

CPC . A47B 21/06; A47B 83/045; A47B 2021/066; A47B 2083/003; B64F 1/36; H01R 13/518

See application file for complete search history.

(56) References Cited

U.S. PATENT DOCUMENTS

| | | | | | |
|---|---|---|---|---|---|
| 5,881,500 | A * | 3/1999 | Latino | A47B 21/06 52/220.7 |
| 6,267,064 | B1 * | 7/2001 | Ostertag | B01L 9/02 108/50.02 |
| 8,109,215 | B2 * | 2/2012 | Kitada | E04B 2/7422 108/50.02 |
| 8,196,526 | B2 * | 6/2012 | Rheault | A47B 21/04 108/50.01 |
| 9,854,903 | B1 * | 1/2018 | Brandenberg | A47B 21/06 |
| 2002/0040667 | A1 * | 4/2002 | Birsel | A47B 21/00 108/25 |
| 2009/0165680 | A1 * | 7/2009 | Bakker | A47B 21/06 108/50.02 |
| 2015/0320203 | A1 * | 11/2015 | Mandon | A47B 21/06 108/20 |
| 2016/0213145 | A1 * | 7/2016 | Johnson | A47B 83/001 |
| 2017/0155259 | A1 * | 6/2017 | Mecca | A47B 21/06 |
| 2017/0165386 | A1 * | 6/2017 | Huang | A61L 2/10 |

* cited by examiner

*Primary Examiner* — Daniel J Rohrhoff

(74) *Attorney, Agent, or Firm* — Dale Jensen, PLC; Dale Jensen

(57) ABSTRACT

Certain exemplary embodiments can provide a cabinet. The cabinet comprises a base and a top. The base has a substantially planar base cap. The top is positioned on the substantially planar base cap of the base. The top has a substantially planar top cap. The top comprises a plurality of electrical outlets and a plurality of Universal Serial Bus ports.

4 Claims, 10 Drawing Sheets

3000

SYSTEMS, DEVICES, AND/OR METHODS FOR MANAGING ELECTRICAL POWER

CROSS-REFERENCES TO RELATED APPLICATIONS

This application claims priority to, and incorporates by reference herein in its entirety, U.S. Provisional Patent Application Ser. No. 62/717,805, filed Aug. 11, 2018.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a cabinet. The cabinet comprises a base and a top. The base has a substantially planar base cap. The top is positioned on the substantially planar base cap of the base. The top has a substantially planar top cap. The top comprises a plurality of electrical outlets and a plurality of Universal Serial Bus ("USB") ports.

In many public transport lobbies such as airports. Rows of chairs are available for travelers waiting for transportation (e.g., flights). Many travelers have electronic devices (e.g., computers and/or smartphones, etc.) and desire to be able to charge batteries in those devices prior to departing on flights. Many airports presently do not provide a sufficient number of charging stations to support travelers' charging needs. Certain exemplary embodiments address situations, which have few or no electronic device charging stations for travelers utilizing any of many chairs.

Figure 1:
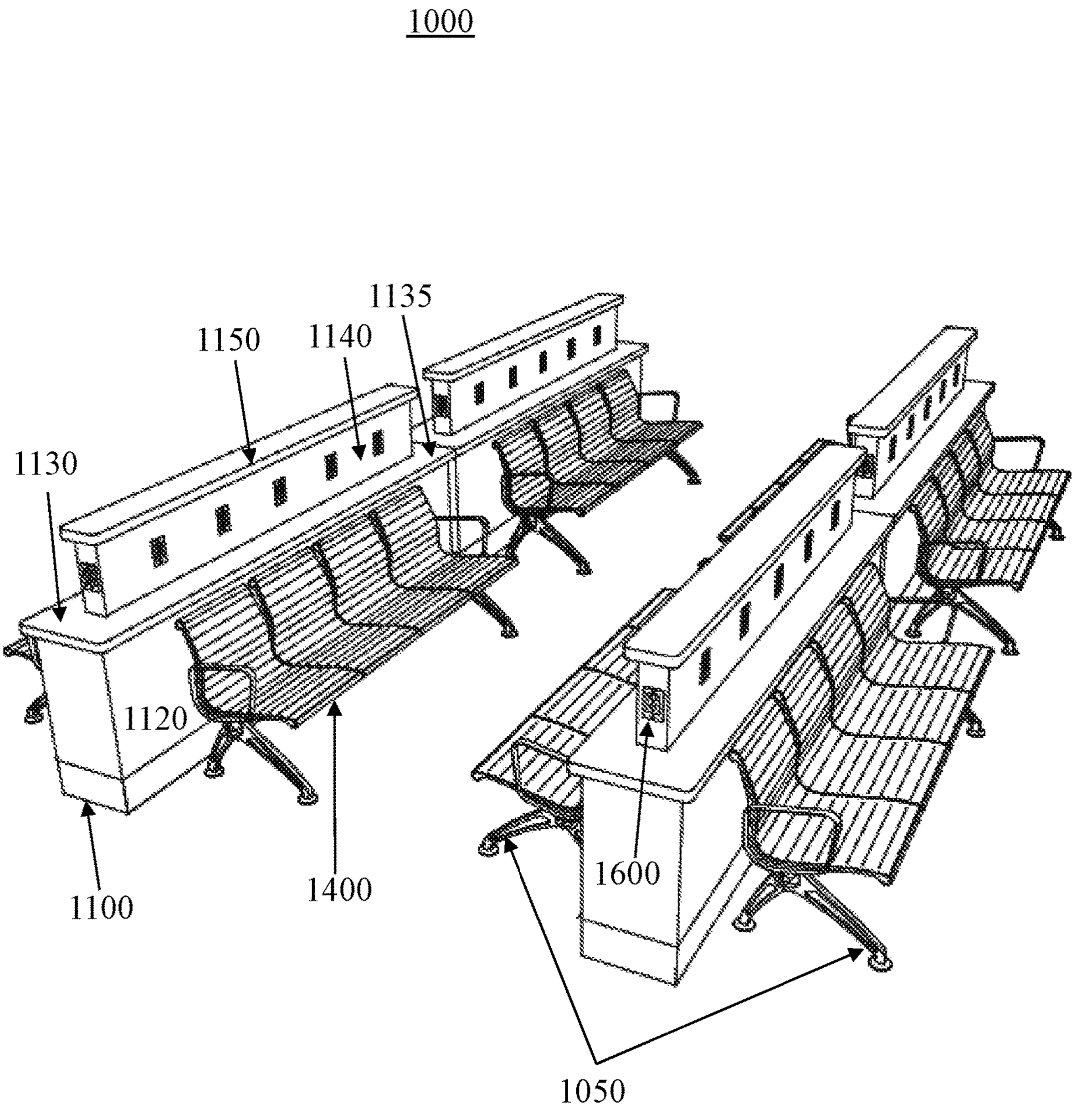
FIG. 1 is a perspective view of an exemplary system 1000.

FIG. 1 is a perspective view of an exemplary system 1000. Cabinet 1100 can comprise a plurality of electrical outlet sets (see, e.g., plurality of electrical outlet sets 2200 of FIG. 2) and a plurality of USB port sets (see, e.g., plurality of USB port sets 2300 of FIG. 2) constructed for patron and/or passenger use. The Plurality of electrical outlet sets and the plurality of USB port sets can be spaced to substantially correspond to spacing of individual chairs 1400 of a row of chairs 1050, such as in an airport lobby. As illustrated, a base cap 1130 comprised by cabinet 1100 provides a surface 1135 on which objects such as electronic devices and/or passenger possessions can rest. A user can place objects such as a drink cup and/or an electronic device on surface 1135 for convenience.

Cabinet 1100 comprises a base 1120 and a top 1140. Base 1120 has a substantially planar base cap 1130. Top 1140 positioned on substantially planar base cap 1130 of base 1120. Top 1140 has a substantially planar top cap 1150. Top 1140 comprises the plurality of electrical outlet sets and the plurality of USB port sets. The plurality of electrical outlet sets and/or the plurality of USB port sets can substantially correspond in location to individual chairs 1400 of row of chairs 1050 positioned adjacent to the cabinet.

Figure 2:
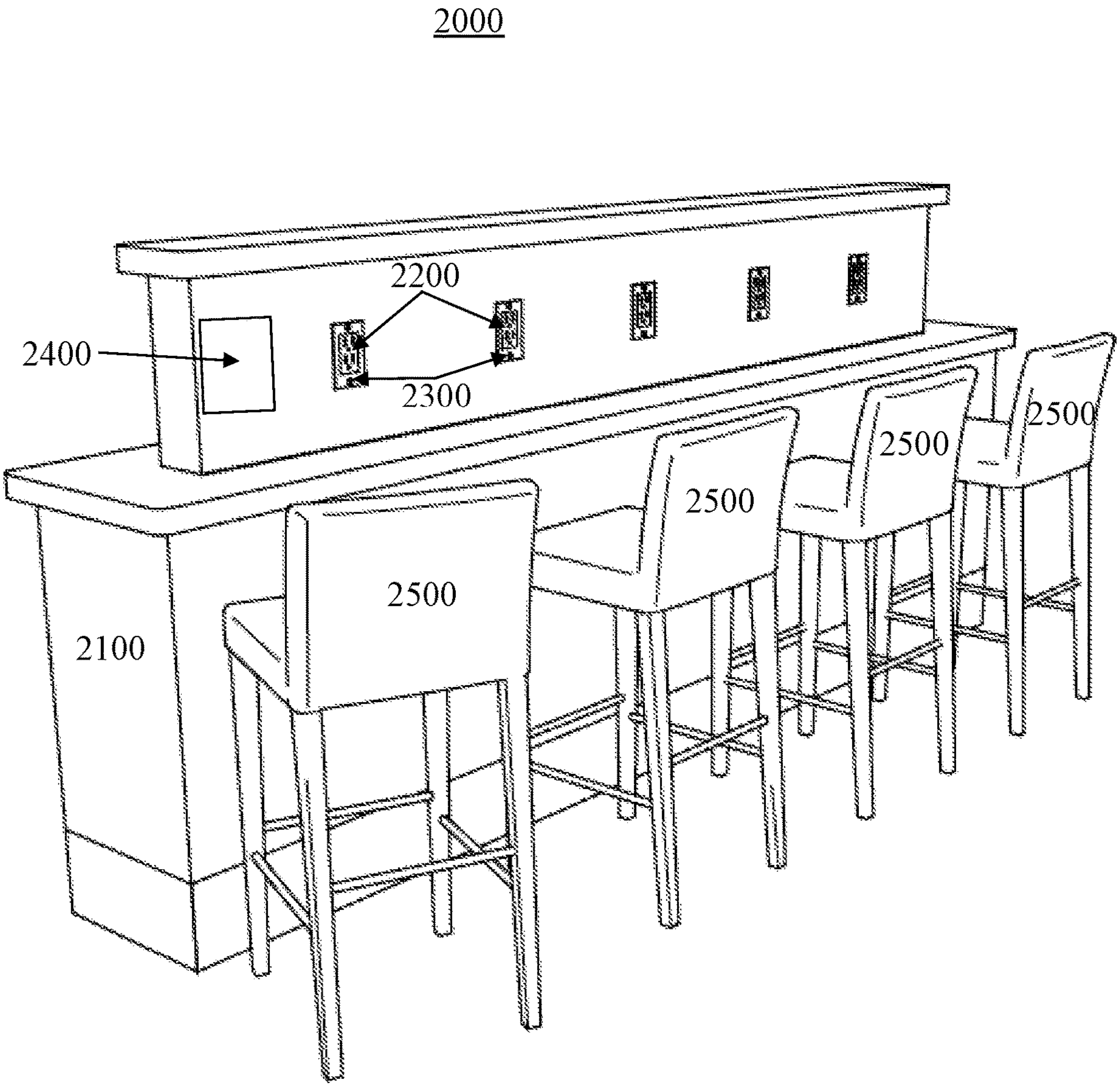
FIG. 2 is a perspective view of an exemplary embodiment of a system 2000.

FIG. 2 is a perspective view of an exemplary embodiment of a system 2000, which comprises a cabinet 2100 constructed to provide a plurality of charging stations for electronic devices. Cabinets such as cabinet 2100 can be constructed with outlet spacing that substantially corresponds to seat spacing in public locations, such as airports. Cabinets such as cabinet 2100 can be constructed to provide a plurality of electrical outlet sets 2200 and/or plurality of USB port sets 2300 for each of set of chairs 2500. The illustrated cabinet 2100 shows receptacles comprising outlets and USB ports. Cabinet 2100 can be covered with attractive exterior surfaces. The attractive exterior surfaces can be used to place placards such as placard 2400, which can comprise commercial advertisements that can assist an enterprise, such as an airport, to improve the economics of providing commercial charging ports to passengers and/or patrons. In embodiments such as that illustrated, a set of chairs 2500 can be individually movable by users.

Figure 3:
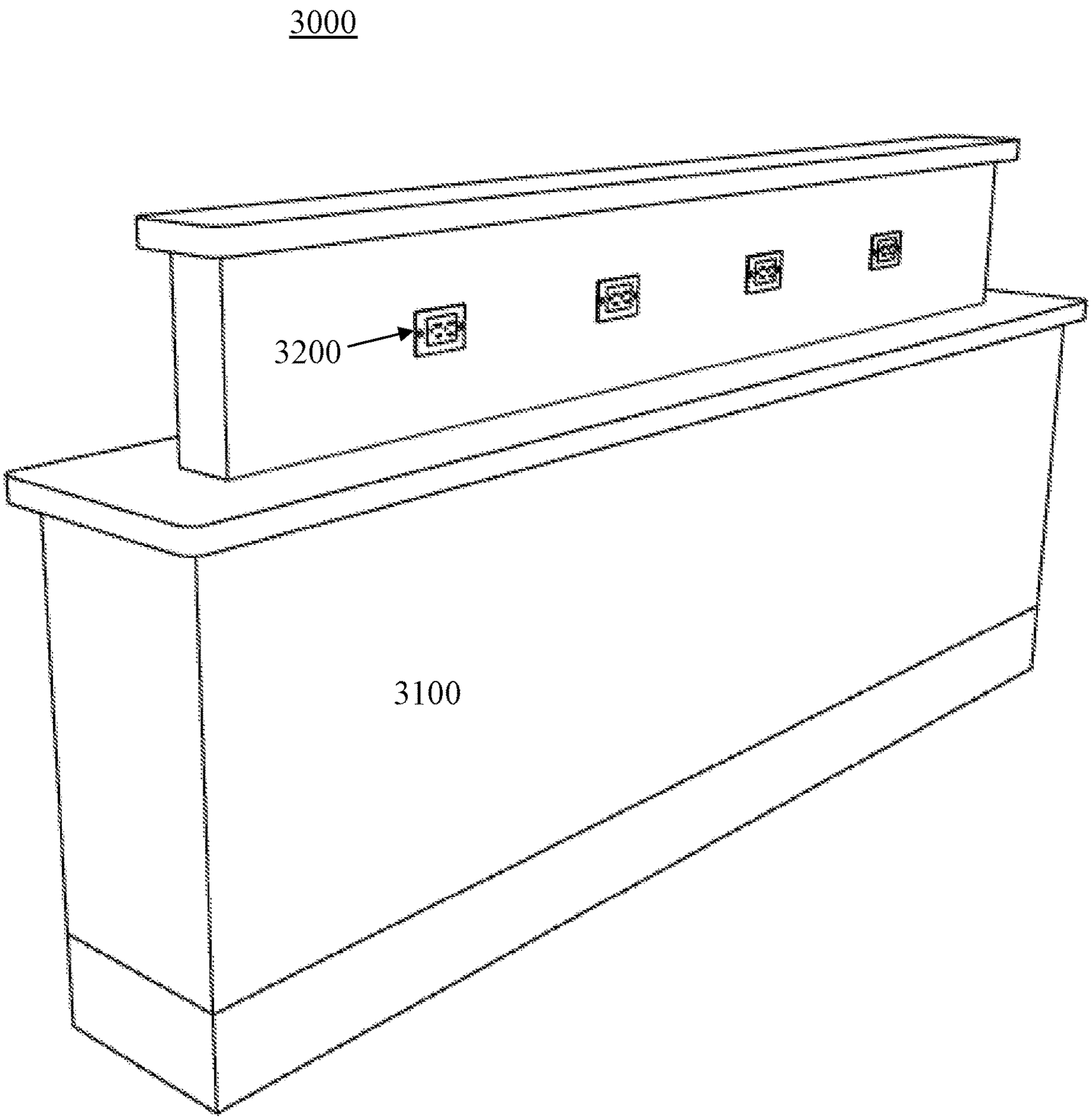
FIG. 3 is a perspective view of an exemplary embodiment of a system 3000.

FIG. 3 is a perspective view of an exemplary embodiment of a system 3000, which comprises a cabinet 3100. Cabinet 3100 comprises charge ports 3200 installed for use by passengers and/or patrons.

Figure 4:
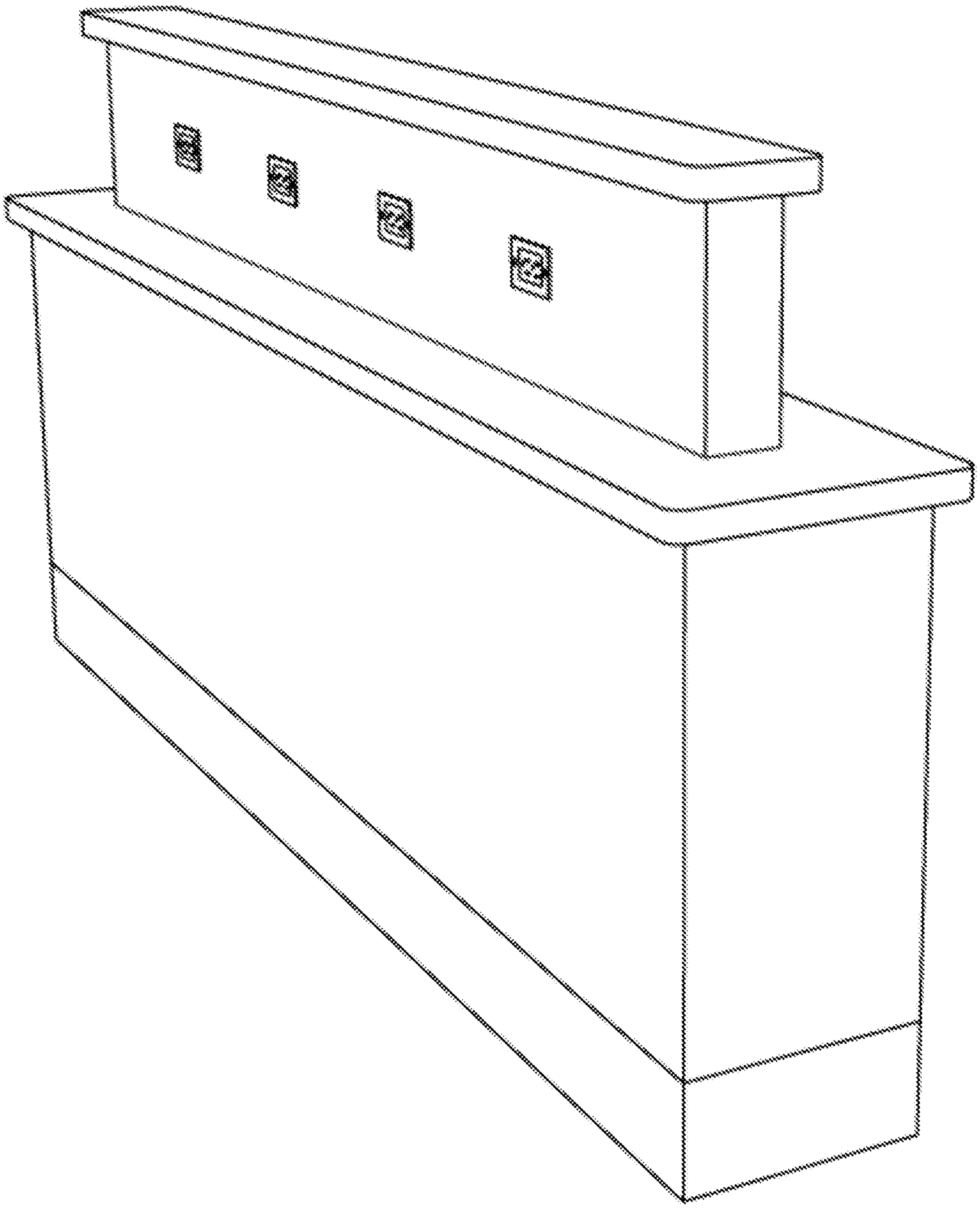
FIG. 4 is a perspective view of exemplary system 3000.

FIG. 4 is a perspective view of exemplary system 3000.

Figure 5:
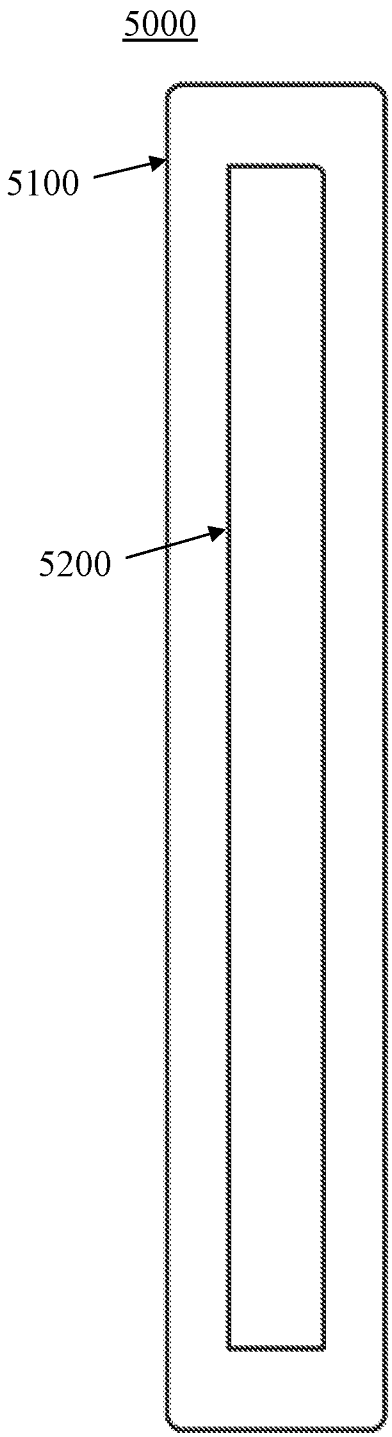
FIG. 5 is a plan view of an exemplary cabinet 5000.

FIG. 5 is a plan view of an exemplary cabinet 5000. Cabinet 5000 can have dimensions that are suitable for particular installations. Dimensions can vary based upon facility specifications and/or other reasons. For example, a length of a base 5100 can be approximately, in inches, 36, 41, 77, 83, 86, 99, 102, 107, 111, 120, and/or any value therebetween. A width of base 5100 can be approximately, in inches, 6.1, 8, 9.3, 13, 16, 19, 22, 27, 31, 33.7, and/or any value therebetween.

A length of a top 5200 can be approximately, in inches, 35, 41, 77, 83, 86, 87, 92, 107, 111, 118, and/or any value therebetween. A width of top 5200 can be approximately, in inches, 4, 4.5, 5.3, 6, 7, 9, 11, 13, 21, 30, and/or any value therebetween.

Figure 6:
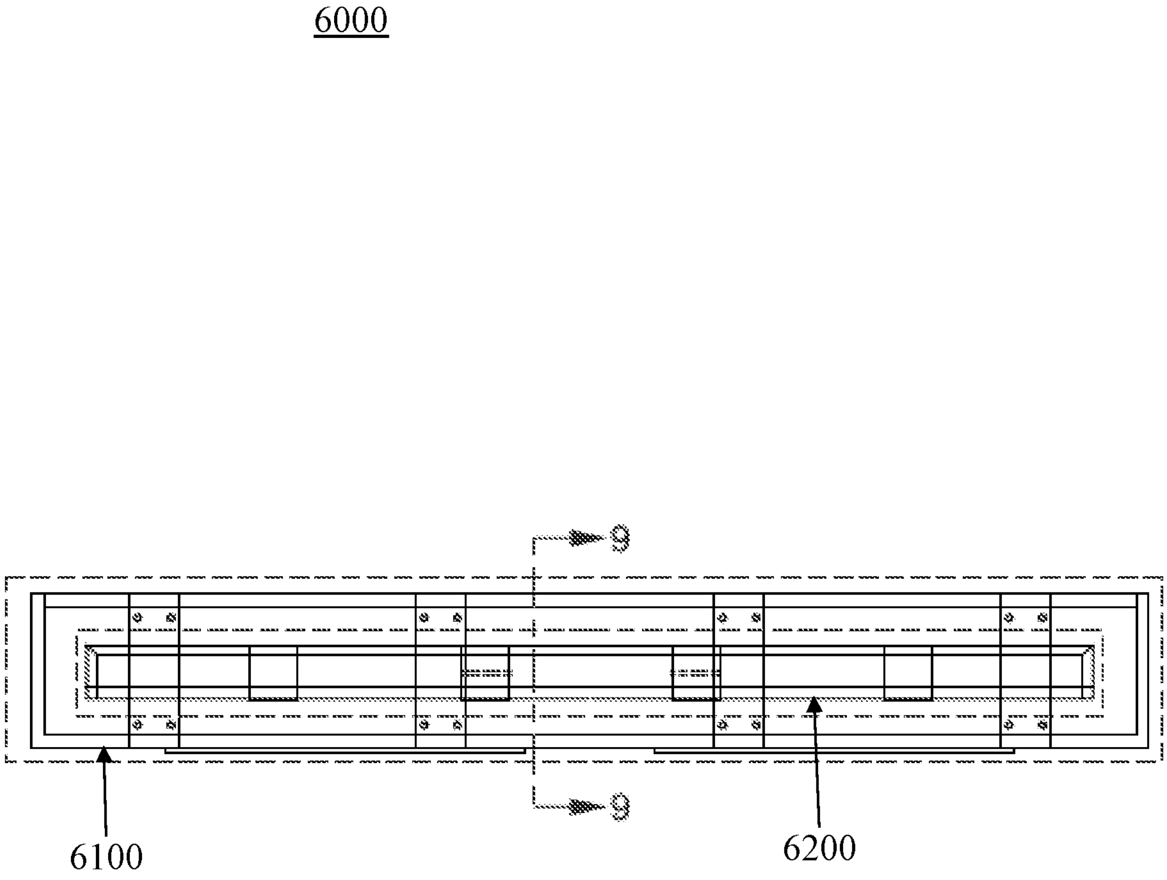
FIG. 6 is a plan view of an exemplary cabinet 6000.

FIG. 6 is a plan view of an exemplary cabinet 6000. Cabinet 6000 can have dimensions that are suitable for particular installations. Dimensions can vary based upon facility specifications and/or other reasons. For example, a length of a base 6100 can be approximately, in inches, 36, 41, 77, 83, 86, 96, 102, 107, 111, 120, and/or any value therebetween. A length of a top 6200 can be approximately, in inches, 33, 41, 77, 83, 86, 87, 92, 107, 111, 118, and/or any value therebetween.

Figure 7:
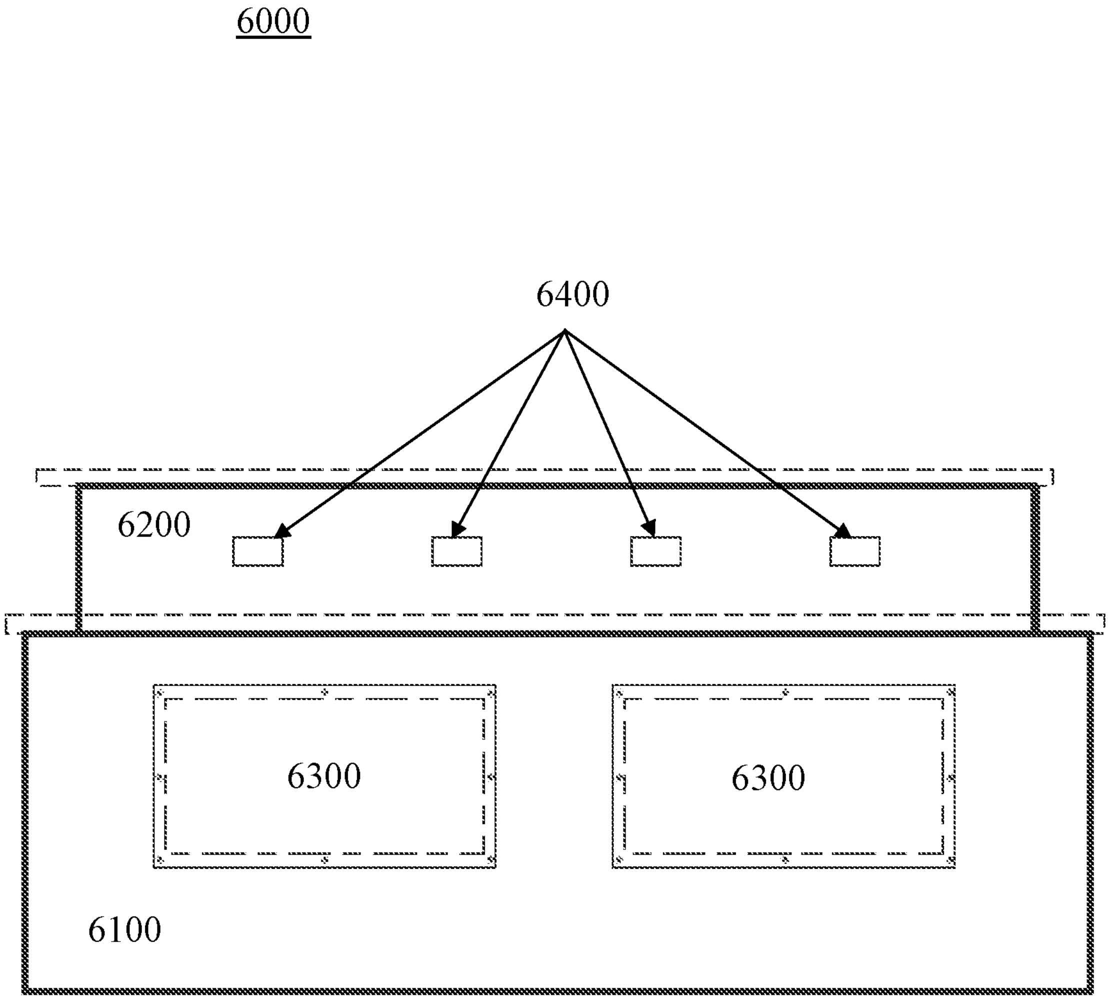
FIG. 7 is a front elevation view of exemplary cabinet 6000.

FIG. 7 is a front elevation view of exemplary cabinet 6000, which comprises a pair of removable panels 6300. Via pair of removable panels 6300, cabinet 6000 can be fastened to a floor and/or outlets 6400 can be coupled to electrical and/or electronic connections. In certain exemplary embodiments, outlets 6400 can comprise ports for obtaining electrical energy and/or Internet access.

A length of each of removable panels 6300 can be approximately, in inches, 16, 18.5, 22.7, 24, 26.5, 28, 29.2, 31.7, 36, 48, and/or any value therebetween. A width of each of removable panels 6300 can be approximately, in inches, 9, 9.5, 12.7, 13.1, 14, 18, 19.2, 21.7, 26, 28, and/or any value therebetween. A height of base 6100 can be approximately, in inches, 18, 19.5, 22.7, 28, 32, 36.6, 39.2, 41.7, 46, 48, and/or any value therebetween. A height of top 6200 can be approximately, in inches, 9, 9.5, 10.7, 11.1, 12, 14, 16.2, 21.7, 26, 28, and/or any value therebetween. Outlets 6400 can be separated such that centerlines thereof are spaced at approximately, in inches, 9, 12, 14, 16, 18, 18.5, 19, 21.7, 26, 28, 34, and/or any value therebetween.

Figure 8:
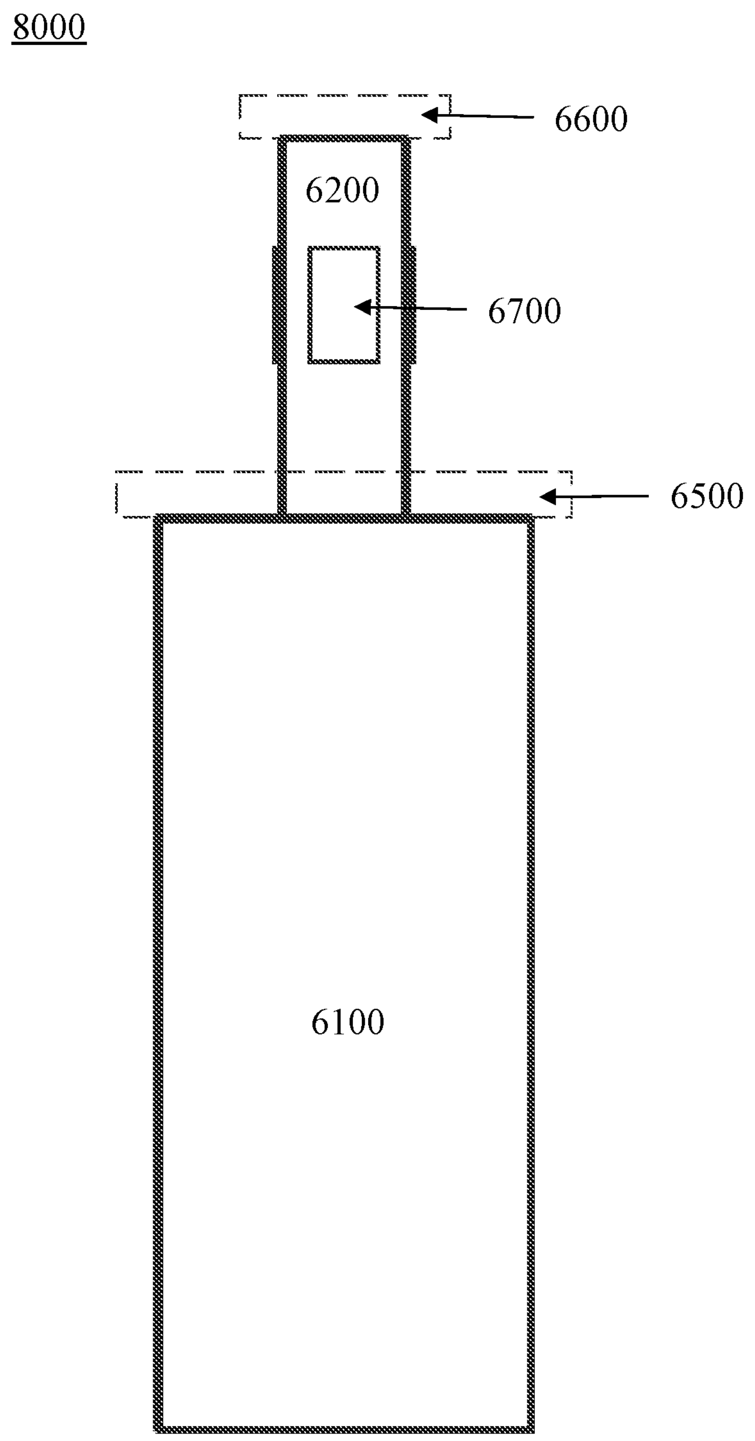
FIG. 8 is an side elevation view of exemplary cabinet 6000.

FIG. 8 is a side elevation view of exemplary cabinet 6000, which illustrates a base cap 6500, a top cap 6600, and an end outlet 6700.

Figure 9:
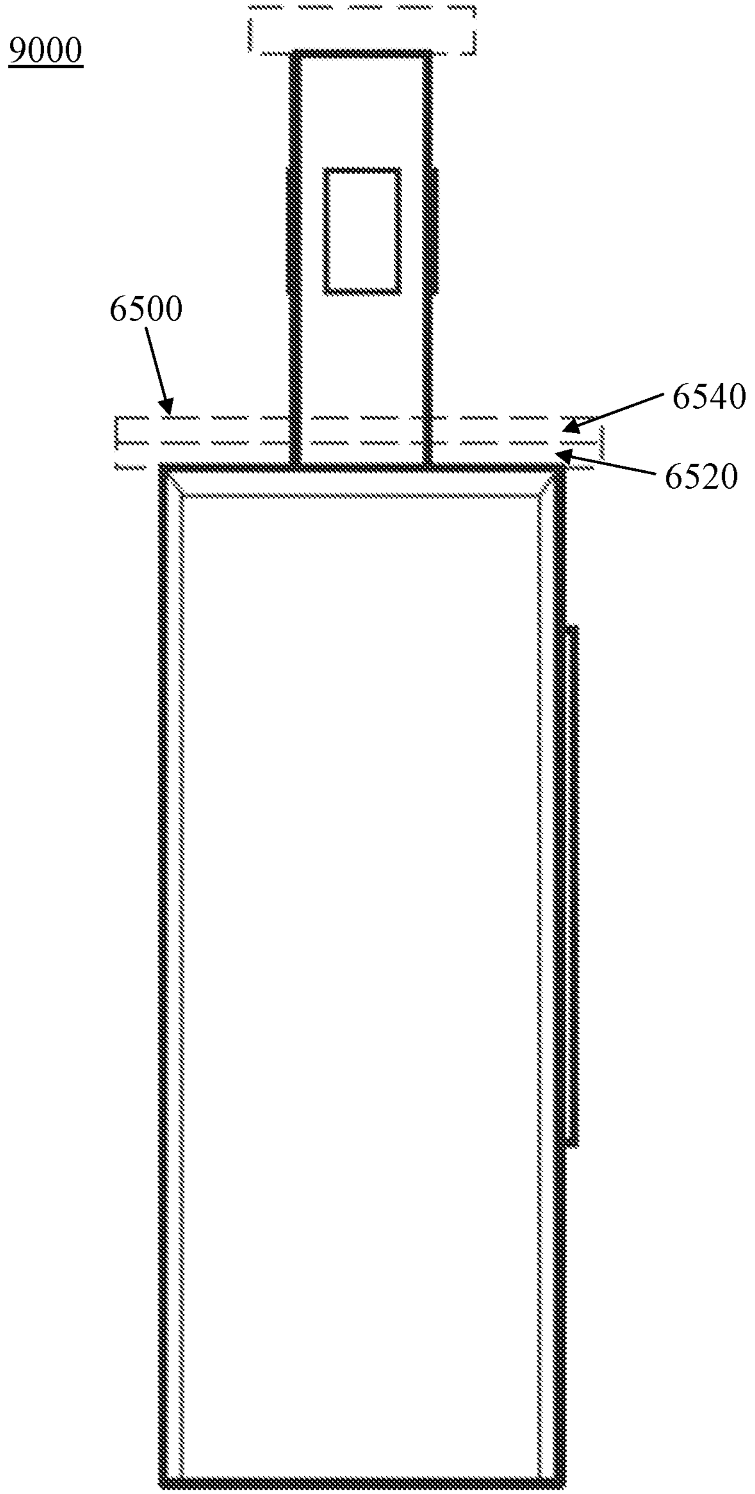
FIG. 9 is a sectional view of exemplary cabinet 6000.

FIG. 9 is a sectional view of exemplary cabinet 6000 taken as indicated in FIG. 6. Base cap 6500 can comprise a subcap 7520 and a cap top 7540. Subcap 7520 can comprise wood, plastic, polyvinyl chloride, polyethylene, a polymer, aluminum, and/or any other selected material. Cap top 7540 can comprise wood, stone, plastic, polyvinyl chloride, polyethylene, a polymer, aluminum, and/or any other selected material.

Figure 10:
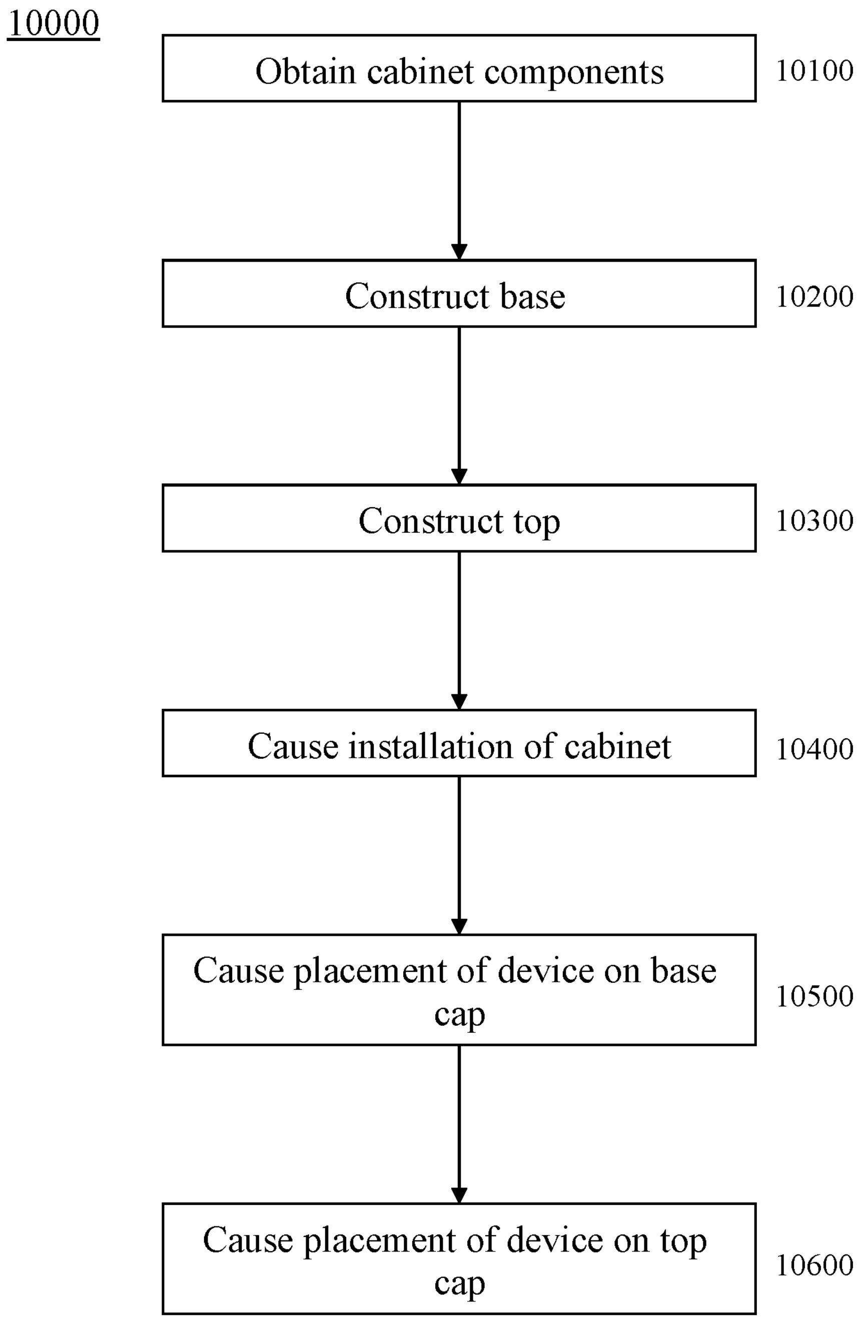
FIG. 10 is a flowchart of an exemplary embodiment of a method 10000.

FIG. 10 is a flowchart of an exemplary embodiment of a method 10000. At activity 10100, cabinet components can be obtained. At activity 10200, a base can be constructed. At activity 10300, a top can be constructed.

At activity 10400, certain exemplary embodiments can cause installation of the cabinet in a waiting area, such as an airport waiting area. In certain exemplary embodiments, the cabinet can comprise a base and a top. In other embodiments, the base and the top can be integral to a single cabinet component. The base can have a substantially planar base cap. The top can be positioned on the substantially planar base cap of the base. The top can have a substantially planar top cap. The top can comprise a plurality of sets of electrical outlets and a plurality of sets of Universal Serial Bus ports. The sets of electrical outlet sets and/or Universal Serial Bus port sets can substantially correspond in location to individual chairs of rows of chairs located adjacent to the cabinet.

At activity 10500, certain exemplary embodiments can cause a user to place an electronic device on the substantially planar base cap. At activity 10600, certain exemplary embodiments can cause a user to place an electronic device on the substantially planar top cap.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

adapter—a device used to effect operative compatibility between different parts of one or more pieces of an apparatus or system.

adjacent—next to in position.

airport—a place from which aircraft operate with paved runways a passenger terminal.

and/or—either in conjunction with or in alternative to.

apparatus—an appliance or device for a particular purpose associate—to join, connect together, and/or relate.

base—a supporting portion of something.

cabinet—a casing constructed to enclose electrical and/or electronic wiring and provide electrical outlets and/or Universal Serial Bus ports constructed to act as electrical charging ports for electronic equipment.

can—is capable of, in at least some embodiments.

cap—a cover.

chair—a piece of furniture on which a human can sit.

circuit—an electrically conductive pathway and/or a communications connection established across two or more switching devices comprised by a network and between corresponding end systems connected to, but not comprised by the network.

comprising—including but not limited to.

configure—to make suitable or fit for a specific use or situation.

connect—to join or fasten together.

constructed to—made to and/or designed to.

correspond—having similar spacing so as to match something.

coupleable—capable of being joined, connected, and/or linked together.

coupling—linking in some fashion.

define—to establish the outline, form, or structure of.

determine—to obtain, calculate, decide, deduce, and/or ascertain.

device—a machine, manufacture, and/or collection thereof.

electrical outlet—a socket that acts as an interface to supply electrical energy having an alternating current to coupled electric equipment, such as in buildings and/or at other sites.

electronic—comprising transistors and/or silicon chips which control and change an electric current passing therethrough.

individual—a separate thing.

install—to connect or set in position and prepare for use.

integrated—formed or united into a whole.

location—a place substantially approximating where something physically exists.

may—is allowed and/or permitted to, in at least some embodiments.

method—a process, procedure, and/or collection of related activities for accomplishing something.

place—to put something in a predetermined location.

planar—having a substantially flat surface.

plurality—the state of being plural and/or more than one.

position—to locate.

predetermined—established in advance.

provide—to furnish, supply, give, and/or make available.

receive—to get, take, acquire, and/or obtain.

repeatedly—again and again; repetitively.

row—a group of seats arranged along an axis.

set—a related plurality.

store—to place, hold, and/or retain.

substantially—to a great extent or degree.

support—to bear the weight of, especially from below.

system—a collection of mechanisms, devices, machines, articles of manufacture, processes, data, and/or instructions, the collection designed to perform one or more specific functions.

top—an uppermost portion of a cabinet.

Universal Serial Bus port—a socket that complies with an industry standard that is currently maintained by the USB Implementers Forum, wherein the socket is constructed to provide electrical energy and/or connectivity to the Internet.

via—by way of and/or utilizing.

waiting area—a room in which passengers tarry.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:

a cabinet, the cabinet comprising a base and a top, the base having a substantially planar base cap, the base having four base sides, the top positioned on the substantially planar base cap of the base, the top having a substantially planar top cap, the top having four top sides, wherein each of the four top sides is offset from a corresponding side of the four base sides such that none of the four top sides are coplanar with any of the four base sides, the top comprising a plurality of electrical outlet sets and a plurality of Universal Serial Bus port sets;

wherein sets of electrical outlets of the plurality of electrical outlet sets and sets of Universal Serial Bus ports of the plurality of Universal Serial Bus port sets substantially correspond in location to individual chairs of a row of chairs positioned adjacent to the cabinet.

2. A system comprising:

a cabinet, the cabinet comprising a base portion and a top portion, the base portion having a substantially planar base cap, the top portion positioned on the substantially planar base cap of the base, the top portion having a substantially planar top cap, the top portion comprising a plurality of electrical outlet sets and a plurality of Universal Serial Bus port sets;

a first row of chairs, the first row of chairs adjacent to a first side of the base portion; and a second row of chairs, the second row of chairs adjacent to a second side of the base portion, wherein the first side of the base portion is an opposing side to the second side of the base portion;

wherein sets of electrical outlets of the plurality of electrical outlet sets and sets of Universal Serial Bus ports of the plurality of Universal Serial Bus port sets substantially correspond in location to individual chairs of the first row of chairs.

3. The system of claim 2 wherein:

the base portion and the top portion are integrated to the cabinet.

4. The system of claim 2 wherein:

a placard is coupled to the cabinet.

* * * * *